Oct. 8, 1957   W. W. CRISSINGER   2,809,249
SWITCH MEMBERS
Filed April 14, 1953
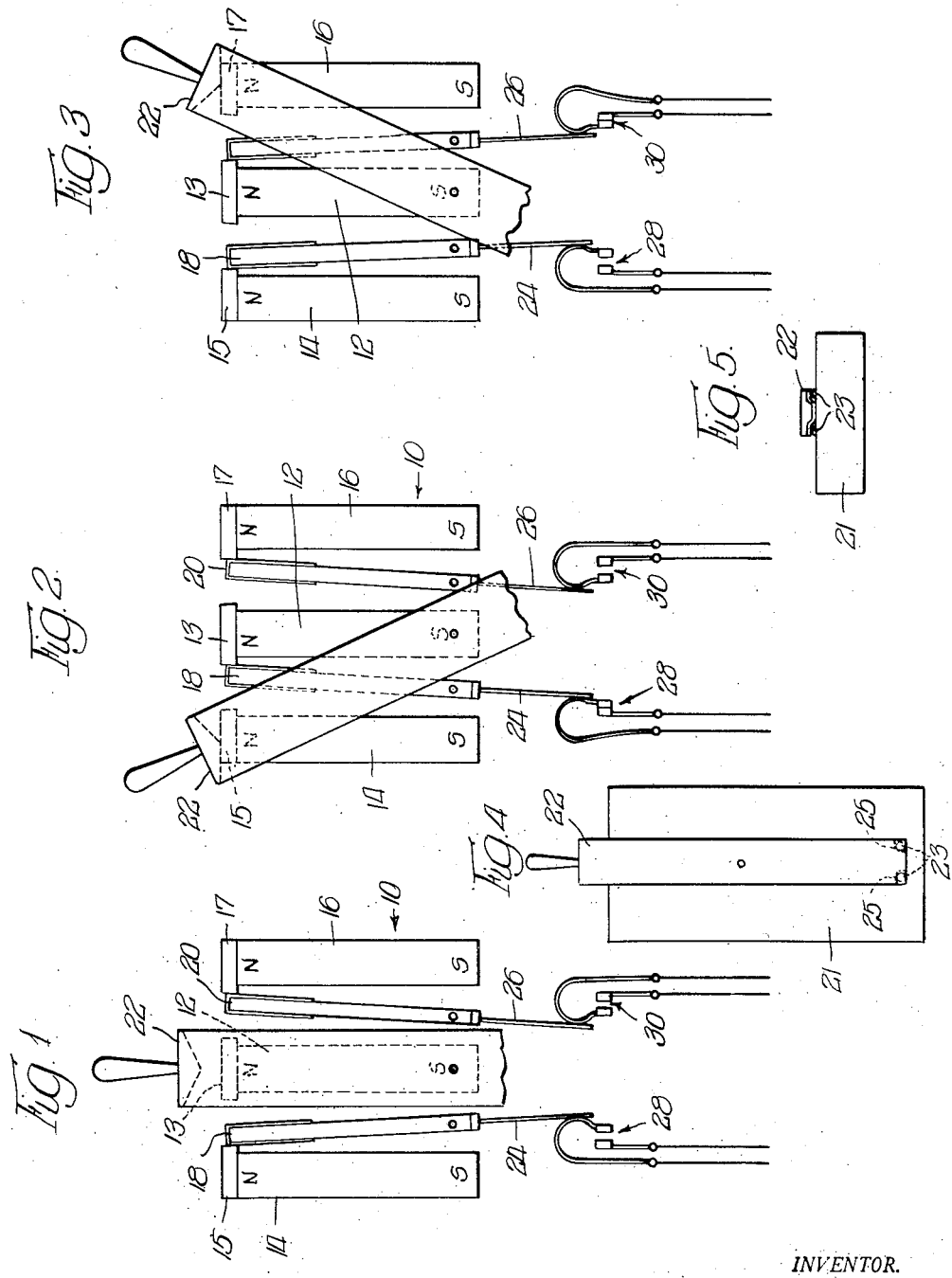
INVENTOR.
Woodrow W Crissinger,
BY
Brown, Jackson, Boettcher & Dienner
Attys United States Patent Office 2,809,249
Patented Oct. 8, 1957

2,809,249
SWITCH MEMBERS

Woodrow W. Crissinger, Galion, Ohio, assignor to North Electric Company, a corporation of Ohio Application April 14, 1953, Serial No. 348,750

9 Claims. (Cl. 200—87)

The present invention relates in general to a novel switch member, and particularly to a novel switch member having a new and novel armature actuating arrangement.

The problem of providing switch members for use in electrical systems of control which are capable of providing reliable and dependable operation as subjected to shock and vibration factors of excessive values has become extremely widespread in the field. The specific nature of these problems, and a novel solution therefor has been presented in copending applications which were filed by this inventor on February 25, 1952, with Serial No 273,296, on April 7, 1953, with Serial No. 347,193, and on December 4, 1953 with Serial No. 396,127, each of these applications having been assigned to the assignee of this application.

Each of the switch embodiments taught therein includes a novel armature actuating arrangement which is extremely practical by reason of its structural simplicity, its snap action operating characteristics, and its ready adaptation to hermetic sealing.

It is a particular object of the present invention to provide a single actuator, multi-armature type switch which includes the novel armature actuating arrangement disclosed in the above identified applications.

It is a specific object of the invention to provide a switch member having a single actuator member which is operative between three given positions to control movement of associated armature members to correspondingly different positions.

These and other operating and structural features are set forth in the following description and drawings in which Figure 1 illustrates the switch member and the positions of the armatures and contact members with the actuator in its first or normal position;

Figure 2 illustrates the positions of the armatures and contact members with the actuator member moved to its second or left of normal position;

Figure 3 illustrates the positions of the armatures and contact members with the actuator member operated to its third or right of normal position;

Figure 4 is a side view of a housing for the switch according to one embodiment, and Figure 5 is an end view of Figure 4.

The switch member 10 as basically shown in Figure 1 comprises a set of three permanent magnets 12, 14 and 16 mounted in aligned spaced parallel relation. Pole-piece members 13, 15 and 17 are located at the outward ends of the magnets to provide more concentrated operating fields for the armature members of the switch. The magnets are arranged with their north poles disposed in aligned relation at one end of the switch, and their south poles disposed in aligned relation at the other end of the switch.

A first armature member 18 is pivotally mounted between magnets 12 and 14 for movement of one of its ends between a first position adjacent pole-piece 13 of the first permanent magnet 12 and a second position adjacent the pole-piece 15 of the second permanent magnet 14. As the end of the armature 18 is moved to either of these positions, the static field of the adjacent permanent magnet means holds the magnetic armature 18 securely in its assumed position.

A second armature 20 is pivotally mounted between magnets 12 and 16 for movement of one of its ends between positions adjacent the pole-piece 13 of permanent magnet 12 and the pole-piece 17 of permanent magnet 16. The static field of the adjacent permanent magnet holds the magnetic armature 20 securely in each of its positions as moved thereto.

An actuator member 22 which controls movement of the armatures 18 and 20 between their two stable positions basically comprises a magnetic member of a U-shaped construction which is mounted externally of the switch housing in physically unattached relation with the armatures. The legs of the U-shaped member extend along either side of the magnets and are pivotally rotatable about pin members located at the approximate balance point of the handle. The pin members may be attached to the housing as taught in detail in copending application Serial No. 273,296.

The actuator is operable between three given positions. In its first or normal position, as shown in Figure 1, the legs of actuator 22 lie in spaced parallel relation with magnet 12 and the actuator is held in that position by the flux emanating from magnet 12. As shown in Figures 4 and 5, auxiliary holding means comprising bump members 23 may be located on the side of the cover 21 for engagement with detents 25 on the handle of the primary actuator 22, whereby a more positive locking means for the actuator in its so called "off," or normal, position is provided.

With movement of the actuator 22 from its normal position to its left of normal position adjacent magnet 14 (Figure 2), the base of the actuator 22 will be brought into contact with pole-piece 15 of magnet 14 and will be firmly held thereat by the flux emanating from magnet 14. With movement of the actuator 22 from normal to its right of normal position in the other direction (Figure 3), the base of the actuator will be brought into contact with pole-piece 17 of the magnet 16 and will be firmly held thereat by the flux emanating from magnet 16.

The positions of the armatures 18 and 20 at any given time are determined by the position of actuator 22. As shown in Figure 1 with actuator 22 in its normal position, the free or outer end of armature 18 lies adjacent the pole-piece 15 of magnet 14 and the free or outer end of armature 20 lies adjacent pole-piece 17 of magnet 16.

With movement of the actuator to the left of normal (Figure 2), the outer end of armature 18 will move to its position adjacent the pole-piece 13 of magnet 12 and the outer end of armature 20 will remain in its position adjacent pole-piece 17 of magnet 16.

With movement of the actuator 22 from center position to the right of normal (Figure 3), the outer end of armature 18 will remain in its position adjacent pole-piece 15 of magnet 14 and the outer end of armature 20 will move to its position adjacent pole-piece 13 of magnet 12.

A pair of contact actuator members 24 and 26, as schematically illustrated, may be attached to the lower or inward ends of armature members 18 and 20 respectively, and associated contact sets 28 and 30, also schematically shown, may be positioned for operation to open and closed positions in accordance with the operated positions of the armatures 18 and 20.

The contact actuator arms 24 and 26 effect a center-off-position for the "center-off" switch embodiment of this disclosure wherein the contacts of both sets 28 and 30 are open with the actuator in its normal position. The contacts of set 28 are closed and the contacts of set 30 are opened with the actuator in its second or left of normal position (Figure 2), and the contacts of set 28 are opened and the contacts of set 30 are closed with the actuator in its third or right of normal position (Figure 3).

It is apparent from the foregoing description of the switch structure that various open and closed circuit conditions may be provided as desired by modifying the contact pileups in a well known manner. Similarly, the switch form may be modified in accordance with the teachings of my copending application Serial No. 273,296, whereby permanent magnet and electromagnetic actuators are utilized.

Also the specific details of the housing and mounting structure for the magnets 12, 14 and 16, the armatures 18 and 20 and the actuator 22 may vary with the nature of the switch and its intended use, and it is believed that the structural details for various switch members will be apparent to parties skilled in the art when considered in the light of the disclosure of the aforeidentified copending application.

SWITCH OPERATION

Actuator in normal position

With the actuator in its central or normal position, as illustrated in Figure 1, the free or outer end of armature 18 will be adjacent the pole-piece 15 of magnet 14, and the free or outer end of armature 20 will be adjacent pole-piece 17 of permanent magnet 16. Armature 18 assumes such position in that the amount of flux of permanent magnet 14 which threads armature 18 is substantially greater than the amount of flux of magnet 12 which threads the armature 18. The lines of flux of magnet 12 which influence armature 18 at this time are substantially less by reason of the higher permeability return path which is provided by the actuator 22 for the flux which emanates from magnet 12.

Armature 20 is in its position adjacent pole-piece 17 of magnet 16 in that the amount of flux from permanent magnet 16 which threads armature 20 with the actuator in its central position is greater than the amount of flux from magnet 12 which will act upon armature 20. The decreased flux of magnet 12 relative to armature 20 results from the higher permeability return path for such flux which is provided by the actuator 22 when it is in its normal position.

Extremely strong holding forces are provided by the magnets 12, 14 and 16 to hold the armatures 18 and 20 respectively in their positions adjacent same. The actuator of the "center-off-switch" is likewise held in its various positions by the adjacent one of the magnets. If desired, additional holding means such as shown in Figures 4 and 5 may be used to maintain the actuator in its "off," or normal, position.

Movement of the magnetic shunt actuator 22 to bring the base portion thereof adjacent the pole-piece 15 (Figure 2) or alternatively adjacent the pole-piece 17 (Figure 3) will cause a shift in the flux distribution, and a very speedy transfer of a corresponding one of the armatures to a new position, a snap action movement resulting because of the greater than linear build-up of actuating force on the moving armature for each progressive increment of its motion toward the magnet.

Movement of actuator to left of its normal position

With movement of the actuator 22 from its normal position (Figure 1) to its position left of normal in which its base member lies adjacent the pole-piece 15 of magnet 14 (Figure 2), the outer end of armature 18 moves adjacent the pole-piece end of magnet 12 and the outer end of armature 20 remains in its position adjacent pole-piece 17 of magnet 16. Briefly with movement of the actuator 22 toward its new position adjacent pole-piece 15, the flux distribution alters so that more and more flux from the magnet 12 threads armature 18, while simultaneously the flux threading the armature 18 from the magnet 14 is being reduced by the fact that the actuator 22 is providing a high permeability shunt return path for the flux emanating from the pole-piece end of the magnet 14.

As the magnetic actuator 22 moves toward the point of contact with pole-piece 15 of the magnet 14, the flux distribution is progressively shifted to a point where magnet 12 exerts a greater tractive force on armature 18 than does magnet 14, whereupon a very speedy transfer of the armature from its position adjacent the magnet 14 to a position adjacent magnet 12 is effected, such movement having a snap action characteristic due to the greater than linear build-up of the actuating force upon the armature 18 for each progressive increment of its motion towards its other stable position.

As the actuator and armatures 18 and 20 are moved to the positions shown in Figure 2, the actuator 22 and armatures are held stable thereat by the adjacent magnet members 14, 12 and 16 respectively. That is, the end of the armature 18 lies adjacent pole-piece 13 of magnet 12, the end of armature 20 lies adjacent pole-piece 17 of magnet 16, and the base of actuator 22 lies adjacent pole-piece 15 of magnet 14. The actuator and armatures each provide a high permeability return path for the flux emanating from their adjacent magnets and are firmly held in their assumed positions.

The operation of the actuator 22 and armatures to these positions effects the closure of the contacts of set 28 and maintenance of the contacts of set 30 in the open position.

As magnetic actuator 22 is now manually displaced from its position adjacent the pole-piece end of magnet 14 toward its normal position, the flux distribution alters so that more and more flux from the magnet 14 threads armature 18, while simultaneously the flux of magnet 12 which threads the armature 18 is being reduced by the fact that the actuator 22 is providing a high permeability shunt return path for the flux emanating from the pole-piece end of magnet 12. As the magnetic actuator 22 approaches its position adjacent the pole-piece end of magnet 12, the flux distribution is gradually shifted to a point where the magnet 14 exerts a greater tractive force on the armature 18 than does magnet 12, whereupon a very speedy transfer of the armature 18 from its position adjacent the magnet 12 to its position adjacent the outer magnet 14 is effected, such movement having the snap action characteristics previously described.

With the actuator 22 in its normal position, the contacts of sets 28 and 30 are opened.

Movement of actuator to its right of normal position

With movement of the actuator 22 to its right of normal position adjacent the pole-piece end of magnet 16 (Figure 3), armature 18 will remain in its position adjacent the pole-piece end of magnet 14, and the end of armature 20 will be moved from its position adjacent the pole-piece end of magnet 16 to its position adjacent the pole-piece end of magnet 12.

Briefly, as the magnetic actuator 22 is manually displaced from its position adjacent magnet 12 toward the outer magnet 16, the flux distribution alters so that more and more flux from the central magnet 12 threads armature 20, while simultaneously the flux of magnet 16 which threads the armature 20 is being reduced by the fact that the actuator 22 is providing a high permeability shunt return path for the flux emanating from the pole-piece end of the outer magnet 16.

As the base of the magnetic actuator 22 approaches the pole-piece end of magnet 16, the flux distribution is gradually shifted to a point where the central magnet 12 exerts a greater tractive force on the armature 22 than the outer magnet 16, whereupon a very speedy transfer of the armature from its position adjacent the pole-piece of magnet 16 to its position adjacent the pole-piece end of the magnet 12 is effected. Armature 18 is held firmly in its position adjacent magnet 14 by the flux emanating from the pole-piece 15, and no movement thereof is experienced at this time.

Armature 20 in its movement to its new position is effective at its contact actuator member 26 to effect the closure of the contacts of set 30. Contacts 28 are maintained open by armature 18 at this time.

With restoration of the actuator 22 to its central or normal position, armature 20 returns to its position adjacent the end of magnet 16 (Figure 1). Briefly, as magnetic actuator 22 is manually displaced from its position adjacent the pole-piece end of magnet 16 toward the central magnet 12, the flux distribution alters so that more and more flux from magnet 16 threads armature 20, while simultaneously the flux of magnet 12 which threads the armature 20 is being reduced by the fact that actuator 22 is providing a high permeability shunt return path for the flux emanating from the end of the magnet 12. As the magnetic actuator 22 approaches magnet 12 the flux distribution is gradually shifted to a point where the outer magnet 16 exerts a greater tractive force on the armature 20 than does central magnet 12, whereupon a very speedy transfer of the armature from its position adjacent the central magnet 12 to its position adjacent the outer magnet 16 is effected. The contacts of sets 28 and 30 are both in the open condition at this time.

SWITCH CONSTRUCTION

It is apparent from the foregoing that a plurality of magnets may be arranged in combination with a common actuator to control each of a number of armatures to move between predetermined assigned positions. Control contact actuator members may be disposed in various pileup assemblies for control by the armatures in their movement between their various positions.

The simplicity of the operating mechanism lends the switch to use in many types of conventional switch structures, the mounting of the members consisting primarily in the provision of magnets aligned in parallel spaced relation with the armatures positioned therebetween, and an actuator located outside the switch casing operable between several predetermined positions to modify the flux paths of the magnets in a predetermined manner.

Of especial note is the rapid transfer which characterizes the movement of each of the armatures between its various positions. The provision of static magnetic fields integral with the switch which effects this rapid type movement also provides holding forces for the armature and actuators as moved to each of their positions. Additionally the armature and actuators may be pivotally mounted at their centroids to improve balance in overcoming shock and acceleration. Furthermore if the operated contact of the set is arranged to meet a solidly positioned contact with the operated spring overriding after the contacts meet, further protection against improper operation with the application of excessive shock and acceleration forces is provided.

The structure of the various elements of these switches may be likewise modified without departing from the spirit of the invention. The armatures for example may take the form of two thinner armature bars notched for the hinge pin and placed together with the notches matching to form a hinge pin aperture. An insulator may be inserted between the thinner bars if desired, but it is apparent that a degree of flux segregation may be obtained even without the use of an insulator.

The armature may be guided in its movement by various alternative means such as slide pins or guide channels. The motion of the armature may be augmented or biased by the introduction of auxiliary springs or opposing magnetic forces, all of which are considered to be within the spirit and scope of the invention.

Size, shape, number and disposition of the elements may be varied in accordance with the particular application of the switch required. It is within the scope of the invention for example to vary the size, shape, number and disposition of the armatures, actuators, permanent magnets or electromagnets, pole-pieces, air gaps and contact structures. Whereas in the illustrated embodiment the switch structure is maintained stationary and the actuator is movable, it is apparent that actuation of the armature is determined by the relative movement of the actuator and the switch structure, and therefore either the actuator or the switch structure itself can be moved with the correlating part being maintained stationary.

The use of solenoid or relay coils to drive the actuator through the means of mechanical linkages is of course obvious. A feature of such arrangement is the high contact pressure which is provided either in the make or break position of the contacts even though the associated relay coils or solenoids have been deenergized.

It is also apparent that the present structure lends itself to hermetic sealing much in the manner of the embodiments disclosed in the heretofore identified copending applications.

Motion of the magnetic actuator prior to operation of the armature may be controlled over a wide range of values by varying:

(a) The air gaps including total armature travel and influence of non-magnetic shims between the armature and pole-pieces.

(b) The clearance between the magnetic actuator and the pole-pieces.

(c) Contact lever spring pressures which must be overcome by the armature in forcing the contacts closed or open as the case may be.

In that the switch inherently includes permanent magnet means, it is possible to include magnet blow out without introducing further ancillary permanent magnet equipment, this feature having been more fully disclosed in the copending application which was filed December 4, 1953, and received Serial No. 396,127, and was assigned to the assignee of this invention.

Other inherent advantages, features and applications of the switch will be immediately apparent to parties skilled in the art, and are to be considered within the scope of the present invention.

What is claimed is:

1. An armature operating arrangement comprising a plurality of armature members, a plurality of static magnetic field producing members, each of the armature members being interspersed between a different pair of said field producing members to permit attraction of the armature by each of the field producing members of the associated pair to positions adjacent thereto, and actuator means operative to selectively nullify the forces produced by the field producing members to effect snap action movement of the associated armatures between their various positions.

2. An arrangement as set forth in claim 1 in which said field producing members and said armature members are mounted in a housing, and said actuator means is mounted externally of said housing in physically unattached relation with said armatures.

3. An arrangement as set forth in claim 1 in which at least one of said static magnetic field producing members is a member of more than one pair.

4. A switching unit comprising a first, a second and a third permanent magnet member aligned in spaced parallel relation, a first armature pivotally mounted between the first and second of said permanent magnet members for movement between positions adjacent thereto, and a second armature pivotally mounted between the second and third of said permanent magnet members for movement between positions adjacent thereto, and an actuator member movable to various positions adjacent each of the permanent magnet ends and operative at each of its positions to selectively render ineffective the adjacent permanent magnet member relative to the armature associated therewith, and to simultaneously render effective the other of the permanent magnet members associated therewith to effect snap action movement of that armature to its other position.

5. A switching unit comprising a first, a second and a third magnetic force producing member aligned in spaced parallel relation, a first armature pivotally mounted for movement at one end between positions adjacent one end of said first and said second magnetic force producing members, a second armature pivotally mounted for movement of one end between positions adjacent said second and said third force producing members, and an actuator member movable to a first position in spaced parallel relation with said second magnetic force producing member to shunt the lines of force thereof relative to the armatures, and to render effective said first and third magnetic force producing members, whereby said first and second armatures are disposed in their respective positions adjacent said first and third magnetic force producing members.

6. An arrangement as set forth in claim 5 in which said actuator member is movable from its first position to a given position adjacent said first magnetic force producing member to shunt the lines of force thereof relative to said first armature to cause same to move to its position adjacent said second magnetic force producing member with said second armature remaining in its position adjacent said third magnetic force producing member.

7. An arrangement as set forth in claim 5 in which said actuator is movable from its first position to a given position adjacent said third magnetic force producing member to shunt the lines of force thereof to cause said second armature to move to its position adjacent said second magnetic force producing member, with said first armature remaining in its position adjacent said first magnetic force producing member.

8. A switching unit comprising a first, a second and a third magnetic force producing member aligned in spaced parallel relation, a first armature pivotally mounted between the first and second of said magnetic force producing members for movement between positions adjacent thereto, a second armature pivotally mounted between the second and third of said magnetic force producing members for movement between positions adjacent thereto, an actuator member movable between positions adjacent each of said magnetic force producing members and operative at each of its positions to selectively render ineffective the adjacent magnetic force producing member relative to the armature associated therewith, and to simultaneously render effective the other of the magnetic force producing members associated therewith to attract said armature, a first contact actuator member controlled by said first armature member, a second contact actuator member controlled by said second armature member, and contact pile-ups operated responsive to the movement of said armatures between their various positions.

9. An arrangement as set forth in claim 8 in which the contacts of each of said contact sets are opened with said actuator in its normal position, and in which said actuator is operable to a first position adjacent said first magnetic force producing member to cause said armature to move adjacent said second magnetic force producing member to control its associated actuator to close the contact set associated therewith, and in which said actuator is operative to a position adjacent said third magnetic force producing member to cause said second armature to move to a position adjacent said second magnetic force producing member to control its associated actuator to close the contact set associated therewith.

References Cited in the file of this patent

UNITED STATES PATENTS

| 355,815 | Ghegan | Jan. 11, 1887 |
| 692,217 | Sundh | Jan. 28, 1902 |
| 1,844,514 | Mattingly | Feb. 9, 1932 |
| 1,891,568 | Morris et al. | Dec. 20, 1932 |
| 2,323,910 | Hubbell | July 13, 1943 |

FOREIGN PATENTS

| 237,269 | Switzerland | Aug. 16, 1945 |
| 354,970 | Germany | June 17, 1922 |
| 517,572 | Great Britain | Feb. 28, 1939 |